United States Patent [19]

Fussnegger et al.

[11] Patent Number: 5,291,933
[45] Date of Patent: Mar. 8, 1994

[54] COVERING DEVICE

[75] Inventors: Wolfgang Fussnegger, Rohrau; Meinrad Vollmer, Rottenburg, both of Fed. Rep. of Germany

[73] Assignee: Mercedes-Benz AG, Fed. Rep. of Germany

[21] Appl. No.: 992,113

[22] Filed: Dec. 17, 1992

[30] Foreign Application Priority Data

Jan. 29, 1992 [DE] Fed. Rep. of Germany ....... 4202405

[51] Int. Cl.[5] .............................................. E06B 9/56
[52] U.S. Cl. .................................. 160/268.1; 296/105
[58] Field of Search .................... 160/268.1, 270, 271, 160/272, 273.1, 264, 266; 296/37.16, 98, 100, 141, 143, 105

[56] References Cited

U.S. PATENT DOCUMENTS

| | | | |
|---|---|---|---|
| 4,198,091 | 4/1980 | Appleton | 296/63 |
| 4,480,675 | 11/1984 | Berkemeier | 160/121 |
| 4,792,178 | 12/1988 | Kokx | 160/266 X |
| 4,995,663 | 2/1991 | Weaver et al. | 296/105 X |
| 5,080,423 | 1/1992 | Merlot et al. | 296/100 X |
| 5,102,182 | 4/1992 | Haddad | 296/105 X |
| 5,145,230 | 9/1992 | Biancale | 296/100 |

FOREIGN PATENT DOCUMENTS

| | | |
|---|---|---|
| 850515 | 5/1977 | Belgium . |
| 0385191 | 9/1990 | European Pat. Off. . |
| 3906196 | 1/1991 | Fed. Rep. of Germany . |
| 4016708 | 11/1991 | Fed. Rep. of Germany . |
| 4018860 | 12/1991 | Fed. Rep. of Germany . |
| 341858 | 1/1931 | United Kingdom . |
| 2025868 | 1/1980 | United Kingdom . |

*Primary Examiner*—David M. Purol
*Attorney, Agent, or Firm*—Evenson, McKeown, Edwards & Lenahan

[57] ABSTRACT

A covering device, such as is used in particular for covering passenger car loading spaces, consists of a web of a blind and hoops guided on both sides of the web in a guide running in the longitudinal direction. In order to reduce the construction space required when the covering device is open, the web of the blind is rolled up on a take-up rod, from which it can be drawn off counter to the effect of springs. Using a mechanical coupling, the hoops bearing the web of the blind are drawn successively from the waiting or open position, together with the web of the blind. The web of the blind is firmly connected only to the first hoop when viewed from the pulling-out side of the web, and rests loosely upon the other hoops.

5 Claims, 2 Drawing Sheets

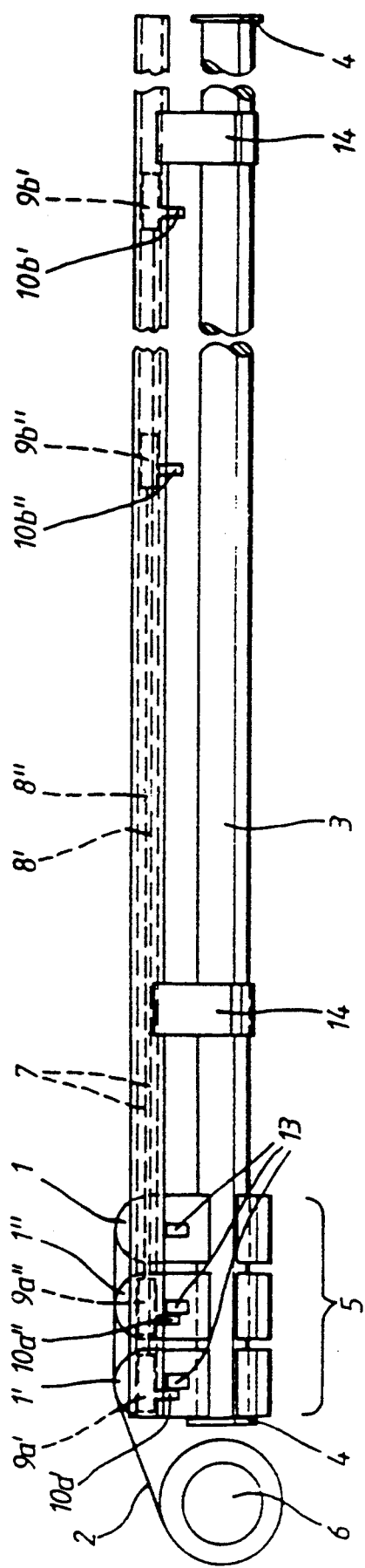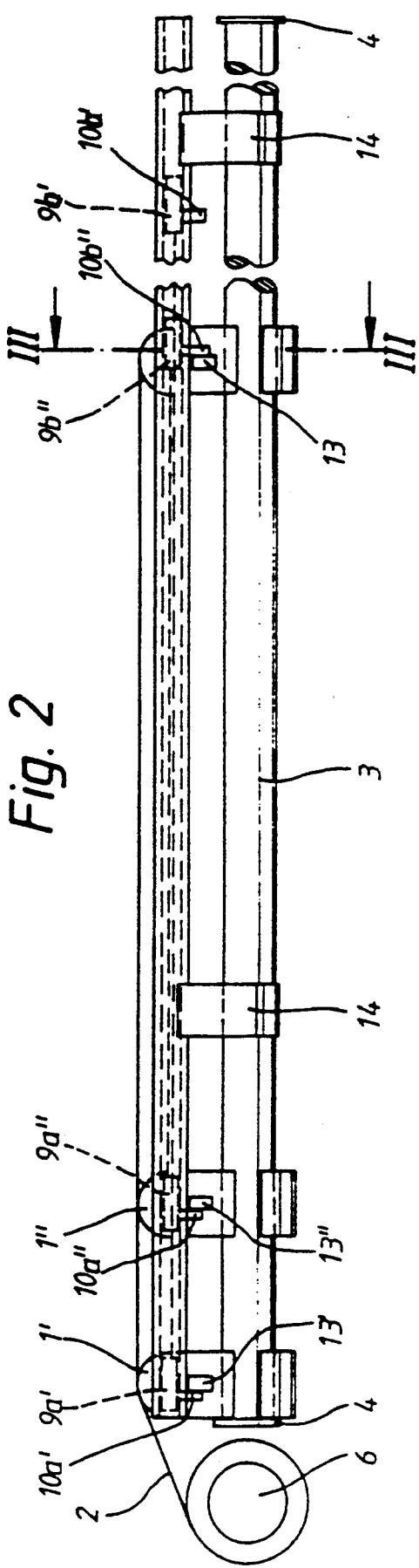

5,291,933

COVERING DEVICE

BACKGROUND AND SUMMARY OF THE INVENTION

The invention relates to a covering device and in particular, to a covering device for passenger car loading spaces having a blind with a flexible web which is supported by a plurality of hoops and is attached by its free end to the first hoop viewed from the pulling-out side of the blind. The covering device further has guide rails which run in the longitudinal direction on both sides, on which stops are mounted at both end faces, and on which the hoops are mounted so as to be displaceable. The covering device still further has means for the successive drawing of the hoops from a waiting or open position together with the web of the blind.

Such a device is known, for example, from German Patent Document 3,906,196. Such covering devices are used, in particular, for covering the loading space of estate cars. However, they can also be used in other areas in which flexible covers are used, for example, when installed in an approximately horizontal position, as sun shade blinds in windows of vehicles and buildings, such as greenhouses and conservatories.

In this known loading space cover, the web of the blind is attached to the hoops by holding loops which are guided in guide rails mounted on both sides. When the covering device is pushed together, portions of the web of the blind hangs down in the manner of a garland between the hoops then located adjacently. As a result, when the hoops are pushed together, a large space is required below the plane for the garlands of the cover as well as in the direction of displacement of the hoops to accommodate them because the hoops cannot be pushed into a block due to the required inherent rigidity of the web of the blind. This problem becomes greater as the length of the covering device increases.

Furthermore, it is known from German Patent Document 4,018,860 to use hoops engaging in one another in the rest position in order to secure the position of the hoops and to prevent self-acting opening of the cover. In German Patent Document 4,018,860, different designs of such as engagement are presented. One specific embodiment proposes moulding insertion elements onto the hoops in the region of the guide strip, which insertion elements are shaped in a negative manner relative to one another, engage in one another when the hoops are pushed together, and thus form a closed chain of hoops.

The object of the present invention is to improve the covering device of the basic generic type described above to the extent that, when the covering device is open, the space required for it is reduced.

According to the present invention, this object is achieved by a covering device wherein the web of the blind is freely movable relative to the other hoops which are offset relative to the first hoop. The web only rests loosely on the other hoops, in that the web of the blind can be rolled up onto a take-up rod which is arranged on the other side of the waiting position of the hoops, is mounted rotatably and is prestressed by spring force in the rolling-up mechanism, and in that the means for the successive drawing of the hoops are formed by a mechanical coupling of the hoops which is separate from the web of the blind, is limited to the two end sides of the hoops and can be pushed together.

Due to the fact that the web of the blind is not firmly connected to the hoops, other than the first hoop, but only rests loosely on upon them, it is possible to roll up the web of the blind in a space saving manner onto a take-up unit, which is known per se, in the form of a spring-tensioned, rotatable take-up rod. In this case, the hoops can be pushed back up to a stop and can be pushed tightly onto one another. When the web of the blind is pulled out, the hoops are guided along successively from the waiting position synchronously with the region of the web of the blind which they are intended to support.

Other objects, advantages and novel features of the present invention will become apparent from the following detailed description of the invention when considered in conjunction with the accompanying drawings.

BRIEF DESCRIPTION OF THE DRAWINGS

FIG. 1 is a lateral view of the covering device in its open position,

FIG. 2 is a lateral view of the covering device in a partially closed position,

DETAILED DESCRIPTION OF THE DRAWINGS

Figure 3:
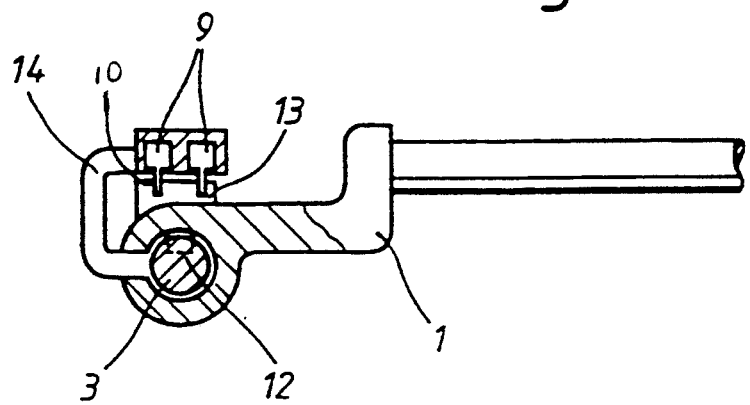
FIG. 3 is a cross-sectional view through the guide rail and the hoop with a driver, taken along section line III—III in FIG. 2.

FIG. 1 illustrates a lateral view of the covering device in an open position using a mechanical coupling 7 of the hoops. The couplings are each formed by a pair of drag pin bodies which are guided parallel to the guide rails, are connected to one another by means of a wire, and have moulded onto them drag pins which act on the hoops. The hoops 1, 1', 1" guided on the guide rails 3 are situated in the waiting or open position 5 which directly adjoins the stop 4. Situated after the stop 4 is the take-up rod 6, on which the web 2 of the blind is rolled up. The free end of the web 2 of the blind is attached to the first hoop 1.

In the region of the guide rails 3, drivers 13 are moulded onto the upper side of each hoop. Since three hoops are illustrated in the arrangement shown, two couplings 7 are required between the hoops, whose parts are identified in the drawing by ' or ". A coupling 7 consists in each case of two drag pins bodies 9a, 9b, each having a moulded-on drag pin 10a, 10b. The drag pin bodies are connected to one another by means of a wire 8. The length of the wire defines the displacement path which has to be travelled before the hoop is carried along. In the waiting position 5 of the hoops, the one set of drag pin bodies 9a', 9a" is situated in the waiting position region 5 behind the hoop 1', 1" assigned to the drag pin bodies. The drag pin body 9b', 9b" connected to drag pin bodies 9a', 9a" by means of the wire 8' or 8' is situated at that point on the guide rail at which the first hoop 1 must be situated if the hoop 1' or 1" is to be carried along. In this case, the drag pin body 9a' which is furthest to the rear on the side of the hoops is connected by means of the longest wire 8' to the drag pin body 9b' which is situated the furthest to the front, such that there is a linkage of overlapping pairs of drag pin bodies. By using wire as the connecting element, curved guide rails can also be used.

It can be seen in FIG. 2, which shows the covering device in a partially closed position of the blind, how the driver 13 of the first hoop 1 strikes against the drag pin 10b'' of the drag pin body 9b'' when the blind is pulled out and, as a result, pushes along the drag pin body 9b'' when the hoop 1 is displaced further. Since the wire 8'' connects the drag pin body 9b'' to the drag pin body 9a'' and the latter engages by means of the drag pin 10a'' on the driver 13'' of the second hoop 1'', the second hoop 1'' is pulled along. If it were to be displaced further, the driver 13 of the first hoop 1 would also strike against the drag pin 10b' of the second drag pin body 9b' and, as a result, also pull the second hoop along in the manner already described above. When the blind is pushed back, the pulled-out hoops remain in the final position of displacement until they are pushed back directly by the hoop located in front of them. In this case, the couplings 7 are likewise taken back since the drivers 13', 13'' engage on the drag pins 10a' or 10a''.

FIG. 3 shows the section III—III through a hoop, the driver device and a guide rail. Running in the guide rail 3 is a wrap-around drive 12 which engages on the first hoop 1 and which can be driven by means of a motor and operates as a displacement drive. The drag pin bodies run in a drag pin body guide 14 which runs parallel to the guide rail 3. It can be seen how the driver 13 of the hoop engages on the drag pins 10b' and 10b'' of the drag pin bodies 9b' and 9b'.

Figure 4:
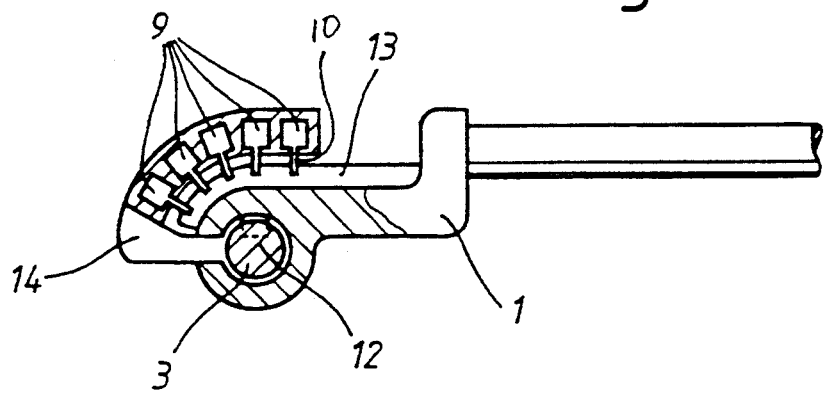
FIG. 4 is an alternative embodiment having a plurality of drivers, of the cross-sectional view of FIG. 3.

In the same cross-section view, FIG. 4 shows another embodiment design having five drivers which allows a cover to operate with six hoops. Any other number of couplings and hoops are also conceivable provided it is possible to guide the driver bodies adjacently parallel to the rail.

Figure 5:
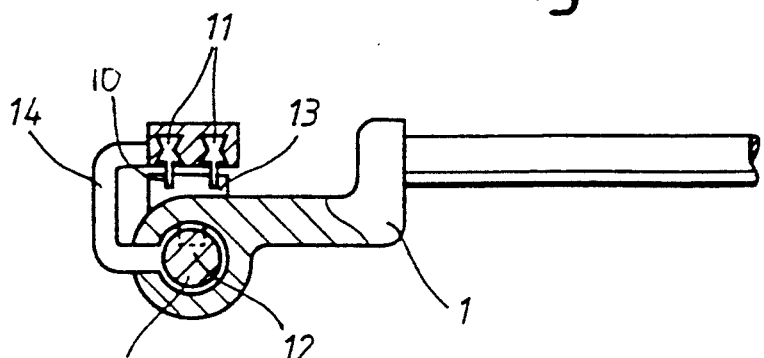
FIG. 5 is a further embodiment having fixed coupling rods, of the cross-sectional view of FIG. 3.

FIG. 5 illustrates in cross-section an alternative embodiment design, in which, instead of the coupling with the drag pin bodies connected to one another via a wire, the coupling is effected by coupling rods such as telescopic members 11. These have the advantage of being more sturdy due to their rigidity, but can only be used on straight guide rods 3. The drag pins 10 are moulded directly onto the telescopic members 11.

Figure 6:
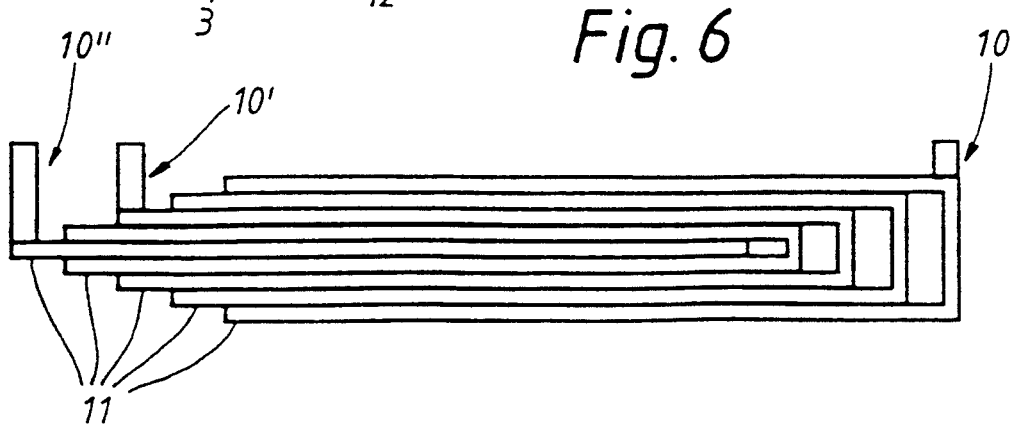
FIG. 6 is a section view taken in the direction of the longitudinal axis through coupling rods which are mounted telescopically one inside the other.

FIG. 6 shows a section view through a space-saving design, in which the coupling rods 11 are guided one inside the other in the manner of a telescope. When the covering blind is opened, the first hoop strikes against the drag pin 10, which is mounted on the outermost telescopic member 11, seen from the pulling-out side. When opened further, the first hoop causes the telescopic members 11 located further towards the inside to be pulled along after the displacement path of the telescopic member located above it has been used up. A drag pin 10', which causes the next hoop to be carried along, is moulded onto some of the telescopic members at the end projecting from the telescopic member located above it. Such an arrangement of the telescopic members 11 can readily be mounted inside the guide of the hoops. In that case, however, the guide must have a slot in the longitudinal direction, through which the drag pins 10 protrude and can thus act directly on the hoops in the region of the guide.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A covering device comprising:
   a blind with a flexible web;
   a plurality of hoops, having end sides, supporting said web, said web having a free end attached to a first of said plurality of hoops;
   guide rails, having end faces, arranged in a longitudinal direction on both sides of said web and having stops mounted on the end faces of the guide rails, said plurality of hoops being displaceably mounted on the guide rails;
   means for successively drawing said plurality of hoops together with said web of the blind from an open position;
   wherein said web is freely movable relative to the other of said plurality of hoops and rests loosely upon them, said other hoops being longitudinally offset relative to the first hoop;
   wherein the web can be rolled up onto a take-up rod arranged at one end of the guide rails, said take-up rod being rotatably mounted and prestressed by spring force in a rolling-up mechanism for the web; and
   wherein said means for successively drawing said plurality of hoops are formed by a mechanical coupling of the hoops, separate from the web, that can be pushed together, and wherein said mechanical coupling couples the plurality of hoops on their end sides.

2. A covering device according to claim 1, wherein said mechanical coupling includes a pair of drag pin bodies guided parallel to said guide rails and connected to one another by wire, said drag pin bodies having drag pins moulded onto them which act on the plurality of hoops.

3. A covering device according to claim 1, wherein the mechanical coupling includes a rigid coupling rod with moulded-on drag pins.

4. A covering device according to claim 1, wherein the mechanical coupling is formed by a telescopic coupling rod having a plurality of telescopic members corresponding at least to the plurality of hoops, and wherein a drag pin is moulded onto at least one of the plurality of telescopic members on an overhang projecting beyond an end of the telescopic member, located above it in a pushed-together state of the telescopic coupling rod.

5. A covering device according to claim 4, wherein the telescopic coupling rod is guided inside the guide rails, the drag pins projecting through a slot running longitudinally in the guide rails and engaging on the hoops.

* * * * *